(12) United States Patent
Iriarte Baleztena

(10) Patent No.: US 10,856,557 B2
(45) Date of Patent: Dec. 8, 2020

(54) METHOD FOR COATING A PIECE OF CHOCOLATE AND COATED PIECE OF CHOCOLATE

(71) Applicant: Juan María Iriarte Baleztena, Bera de Bidasoa (ES)

(72) Inventor: Juan María Iriarte Baleztena, Bera de Bidasoa (ES)

( * ) Notice: Subject to any disclaimer, the term of this patent is extended or adjusted under 35 U.S.C. 154(b) by 262 days.

(21) Appl. No.: 15/783,720

(22) Filed: Oct. 13, 2017

(65) Prior Publication Data

US 2018/0064129 A1 Mar. 8, 2018

Related U.S. Application Data

(63) Continuation of application No. PCT/ES2016/070186, filed on Mar. 18, 2016.

(30) Foreign Application Priority Data

Apr. 13, 2015 (ES) .................................. 201530489

(51) Int. Cl.
*A23G 1/54* (2006.01)
*A23G 1/32* (2006.01)
*A23P 30/10* (2016.01)

(52) U.S. Cl.
CPC ............... *A23G 1/54* (2013.01); *A23G 1/325* (2013.01); *A23P 30/10* (2016.08); *A23V 2002/00* (2013.01)

(58) Field of Classification Search
CPC ........... A23G 1/54; A23G 1/325; A23P 30/10; A23V 2002/00
USPC .......................................................... 426/89
See application file for complete search history.

(56) References Cited

U.S. PATENT DOCUMENTS

| | | | | |
|---|---|---|---|---|
| 3,784,714 A | * | 1/1974 | McReynolds .......... | A23G 1/305 426/658 |
| 2005/0202129 A1 | | 9/2005 | Sieber | |
| 2010/0239725 A1 | * | 9/2010 | Turek .................... | A23G 1/0076 426/242 |

FOREIGN PATENT DOCUMENTS

| | | | |
|---|---|---|---|
| DE | 4305752 A1 | | 9/1994 |
| DE | 8812945 U1 | | 12/1998 |
| EP | 2236041 A1 | | 10/2010 |
| JP | 78035143 B | * | 8/1973 |
| JP | H02-265435 A | | 10/1990 |
| JP | 2000-041591 A | | 2/2000 |
| JP | 2002335863 A | * | 11/2002 |
| JP | 2006-141230 A | | 6/2006 |
| JP | 2008-109893 A | | 5/2008 |
| JP | 2012-100570 A | | 5/2012 |
| JP | 2012-116069 A | | 6/2012 |
| KR | 2003-0001169 A | | 1/2003 |
| KR | 20030001169 A | * | 1/2003 |
| WO | 2014098651 A2 | | 6/2014 |

OTHER PUBLICATIONS

Google search results for gold film /foil weight, search criteria included time before Mar. 2013 (Year: 2013).*
Martel: "Xocoa Gold , una tableta de chocolate con lamina de oro de 23 kilates",Dec. 24, 2010, XP002758732, Retrieved from the Internet: URL:http://www.embelezzia.com/gastronomia/xocoa-gold-una-tableta-de-chocolate-con-lami na-de-o ro-de-23-ki lates.
Linders: "Goldleaf chocolate 23 carat Gold and Chocolate", , Jan. 1, 2015 (Jan. 1, 2015), XP002758733, Retrieved from the Internet: URL:http://lindersbonbons.nl/en/goldleaf-chocolate-2.
Written Opinion in corresponding PCT Application No. PCT/ES2016/070186, dated Feb. 17, 2017.

* cited by examiner

*Primary Examiner* — Jyoti Chawla
(74) *Attorney, Agent, or Firm* — Edell, Shapiro & Finnan, LLC

(57) ABSTRACT

Method for coating a piece of chocolate that includes a placement step for placing an edible metal foil having a thickness less than 20 micrometers on at least one part of the outer surface of a surface layer of said piece of chocolate, said layer comprising cocoa butter, a heating step in which the piece of chocolate is exposed to a temperature equal to or greater than the melting temperature of the cocoa butter such that the cocoa butter of said layer melts and attaches said foil to the layer, and a solidification step wherein the melted butter solidifies, the foil being adhered to the surface layer of said piece of chocolate. The invention also relates to a piece of chocolate made according to the methods disclosed herein.

17 Claims, 2 Drawing Sheets

METHOD FOR COATING A PIECE OF CHOCOLATE AND COATED PIECE OF CHOCOLATE

CROSS-REFERENCE TO RELATED APPLICATIONS

This application relates to and claims the benefit and priority to International Application No. PCT/ES2016/070186, filed Mar. 18, 2016, which claims the benefit and priority to Spanish Patent Application No. P201530489, filed Apr. 13, 2015.

TECHNICAL FIELD

The present invention relates to confectionery, preferably with pieces of chocolate comprising edible metals, such as gold and silver.

BACKGROUND

Since edible metals, for example gold or silver, came into existence there has been an increasing consumption of and demand for confectionery products comprising such edible metals.

The characteristics of these metals affect their handling, the final appearance they provide to the food product, for example, to a piece of chocolate and the final product cost. For example, spraying gold powder on a piece of chocolate is known in the state of the art.

Edible metal foils with a thickness less than 20 micrometers are known by the person skilled in the art. By way of example, edible gold foils or leaves more than 22 carats with the official additive name E 175 are known by the person skilled in the art. Nevertheless, these foils are very fragile and therefore hard to handle, so chips or flakes having a size of 0.5 cm by 0.5 cm or less obtained from a metal foil are often used, placing them on the surface of a piece of chocolate.

Patent documents WO2014/098651A2 and WO2015/009196A1 disclose a candy comprising a body externally coated, respectively, by an edible silver coating and by an edible gold coating respectively, and a glaze layer arranged between the gold or silver coating and the body of the candy, the coating being fixed to the glaze layer through a confectioner's glaze varnish.

SUMMARY OF THE DISCLOSURE

A first aspect relates to a method for coating a piece of chocolate comprising the following phases:
  a placement step, wherein at least one edible metal foil having a thickness less than 20 micrometers is arranged on at least one part of the outer surface of a surface layer of said piece of chocolate, said layer comprising cocoa butter,
  a heating step after the placement step, in which the piece of chocolate is exposed to a temperature equal to or greater than the melting temperature of the cocoa butter, such that the cocoa butter of said layer melts and attaches said foil to the layer, and
  a solidification step after the heating step, wherein the piece of chocolate is exposed to a temperature less than the melting temperature of the cocoa butter and said butter solidifies, the foil being adhered to the surface layer of said piece of chocolate.

By means of the method of the invention a piece of chocolate with a metallic appearance similar to that which is obtained after wrapping a chocolate candy with aluminum foil may be obtained, the color being dependent on the metal used, maintaining specific nutritional and organoleptic characteristics. The piece of chocolate obtained may be coated with a uniform metal foil so that the chocolate cannot be seen in the part in which the piece of chocolate is coated with the metal foil and holes in the metal foil cannot be seen either.

The metal foil melts onto the surface layer of the piece of chocolate such that it will not become detached even during the handling thereof.

Another aspect of the invention relates to a piece of chocolate comprising a surface layer comprising cocoa butter and wherein an edible metal foil having a thickness less than 20 micrometers is adhered on at least one part of the outer surface of said layer.

These and other advantages and features will become evident in view of the drawings and the detailed description.

DETAILED DESCRIPTION

Figure 1:
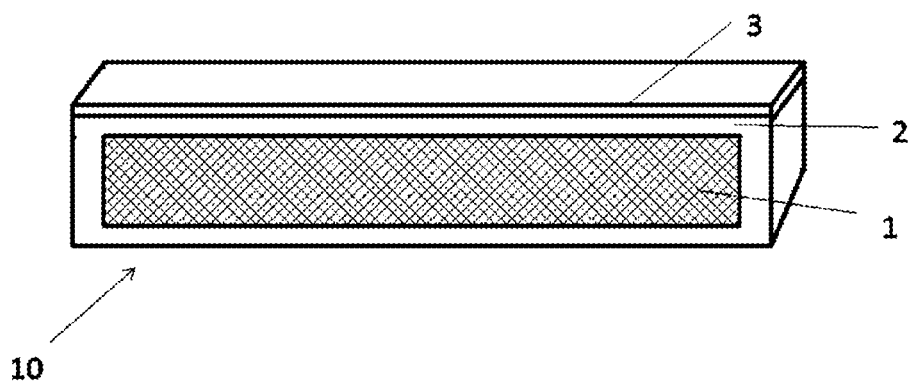
FIG. 1 shows a cross section side view of a piece of chocolate according to a first embodiment.

According to one embodiment a method for coating a piece of chocolate comprises the following phases:
  a placement step, wherein at least one edible metal foil having a thickness less than 20 micrometers is arranged on at least one part of the outer surface of a surface layer of said piece of chocolate, said layer comprising cocoa butter,
  a heating step after the placement step, in which the piece of chocolate is exposed to a temperature equal to or greater than the melting temperature of the cocoa butter, such that the cocoa butter of said layer melts and attaches said foil to the layer, and
  a solidification step after the heating step, wherein the piece of chocolate is exposed to a temperature less than the melting temperature of the cocoa butter and said butter solidifies, the foil being adhered to the surface layer of said piece of chocolate.

In the context of the present disclosure the piece of chocolate refers to a food product comprising chocolate. This piece of chocolate can be, without limitation, a chocolate bar, a chocolate candy or a decoration to be incorporated in a cake, for example.

According to some embodiments the foil has a thickness between 0.120 micrometers and 15 micrometers, preferably 0.125 micrometers. The smaller the thickness, the harder it will be to handle the foil, nevertheless, the cost associated with raw materials is reduced and the organoleptic characteristics of the end product are improved.

According to some embodiments the metal of the edible foil comprises gold or silver or another metal or a mixture thereof.

According to some embodiments the metal foil has between 80% and 99% of gold.

According to some embodiments the metal foil comprises gold of at least 22 carats. This foil is also known as a gold leaf.

In the context of the present disclosure, placement is understood as putting at least one part of at least said foil in direct contact with at least one part of the surface layer of the piece of chocolate.

In the context of the present disclosure, surface layer refers to the layer on which the metal foil is adhered, said layer being a solid layer at a temperature less than 25° C. Said layer comprises cocoa butter and a sufficient minimum thickness so that in the heating phase the cocoa butter melts such that the foil is attached to the surface of the piece of chocolate without it losing its original shape.

In the context of the present disclosure, cocoa butter refers to the edible natural fat from the cocoa bean.

According to some embodiments the surface layer comprises a thickness between 0.7 millimeters and 2 millimeters, preferably 1 millimeter.

According to some embodiments the surface layer comprises between 0.1% and 99.9% of cocoa butter by weight of the product, such as between 20% and 70%. This percentage of cocoa butter is generally related with the organoleptic characteristics to be attained for the piece of chocolate, the hardness of the piece of chocolate and the fat content, among others.

In the context of the present disclosure, the percentages of a composition are percentages by weight.

According to some embodiments the surface layer comprises chocolate.

In the context of the present disclosure, the chocolate is obtained by mixing sugar with two products derived from cocoa beans: cocoa paste and cocoa butter. Different types of chocolate are obtained from this combination depending on the proportion of these components and of other components such as milk, flavorings, emulsifiers and/or stabilizers.

In one embodiment, the surface layer of the piece of chocolate comprises dark chocolate. The dark chocolate usually comprises a proportion of cocoa paste greater than about 45% by weight, since the bitterness of cocoa begins to be perceptible from this amount, and a proportion of cocoa butter greater than about 18% by weight.

In another embodiment, the surface layer of the piece of chocolate comprises milk chocolate. The milk chocolate comprises at least 25% of cocoa paste by weight of the product, at least 15% by weight of milk solids and at least 20% of cocoa butter.

In another embodiment, the surface layer of the piece of chocolate comprises white chocolate. The white chocolate comprises at least 20% by weight of cocoa butter, at least 14% by weight of milk solids and a maximum of 55% by weight of sugar or other sweeteners.

The surface of the surface layer of the piece of chocolate on which the metal foil is adhered can be rough or smooth. According to some embodiments the surface of the surface layer of the piece of chocolate on which the metal foil is adhered is smooth.

According to some embodiments the piece of chocolate is a chocolate, preferably a molded chocolate.

In the context of the present disclosure, a molded chocolate refers to a piece obtained from the solidification of chocolate in a mold, for example, a polycarbonate or metal mold, said solidified chocolate acquiring the shape of the mold. An optimum outer surface of the surface layer is thereby obtained for fusion with the metal foil after the steps of making the shell, filling and sealing the chocolate, known in the state of the art.

Chocolates are usually characterized by having a chocolate covering valued by its hardness and sheen. This covering comprises sugar, cocoa and cocoa butter, the latter comprising different crystals which are obtained from the crystallization or solidification of melted chocolate. The use of chocolate tempering technique for obtaining a covering with the desired hardness and sheen characteristics is known by the person skilled in the art.

The chocolate can comprise different shapes. The chocolate may have a half sphere or sphere shape. These chocolate can have different sizes. Preferably, the chocolate has a small size so that the metal foil does not break when being handled. According to some embodiments the chocolate has a diameter greater than 1.5 cm, preferably a diameter of 3.5 cm.

According to some embodiments the foil covers between 20% and 100% of the total surface of the piece of chocolate.

In the heating step, the butter upon melting allows the foil to attach completely to the surface layer of the piece of chocolate exposed to the air. The heat exposure time is established based on the temperature to which it is exposed, the cocoa butter content of the surface layer, the melting point of the cocoa butter, as well as the thickness of said surface layer. These parameters are those whereby during the heating step the cocoa butter melts such that the foil is attached to the surface of the piece of chocolate without it losing its original shape.

According to some embodiments the cocoa butter has a melting point greater than 26° C.

According to some embodiments in the heating step air is blown onto the foil covering the surface layer, the air comprising a temperature equal to or greater than the melting temperature of cocoa butter.

The blowing furthermore helps the foil, generally having a weight less than 0.100 grams, preferably between 0.010 grams and 0.015 grams, to stick itself on the surface layer of the piece of chocolate, thereby favoring attachment.

This air can be obtained through a heat gun, a compressed air gun or a tool emitting air at a temperature and flow. This flow must have such magnitude that it does not tear or break the metal foil. In addition, said air can be heated by means of any known heating means such as resistances, infrared, etc.

In one embodiment, the air comprises a temperature between 25° C. and 200° C. and a flow between 250 l/min and 500 l/min.

In the solidification step, the piece of chocolate is exposed to a temperature less than the melting temperature, preferably, subjecting the piece of chocolate to a temperature between 20° C. and 25° C., and furthermore preferably to a relative humidity between 40% and 60%. In the solidification step, the foil adheres to the surface of the surface layer of the piece of chocolate. In the context of the present disclosure, adhere refers to fixing the foil on the piece of chocolate, such that once adhered said foil cannot become detached from the surface layer of the piece of chocolate.

Preferably, the room temperature conditions during the preparation of the piece of chocolate are between 15° C. and 25° C. and a relative humidity between 50% and 70%.

Another aspect relates to a piece of chocolate obtainable, for example, using the method of the invention.

The piece of chocolate comprises a surface layer comprising cocoa butter and wherein an edible metal foil having a thickness less than 20 micrometers is adhered on at least one part of the outer surface of said layer.

According to some embodiments the metal foil has a thickness between 0.120 and 15 micrometers, preferably 0.125 micrometers.

According to some embodiments the surface layer comprises between 0.1% and 99.9% of cocoa butter, preferably between 20% and 70% of cocoa butter.

According to some embodiments the cocoa butter has a melting point greater than 26° C.

According to some embodiments the surface on which the foil is adhered is between 20% and 100% of the total surface of the piece of chocolate, preferably between 30% and 75%.

According to some embodiments the surface layer comprises chocolate. This layer can comprise dark chocolate, milk chocolate or white chocolate.

According to some embodiments the metal foil has a size greater than 1 cm by 1 cm.

According to some embodiments the surface on which metal foil is adhered is smooth.

In one embodiment, the foil comprises gold and/or silver, preferably at least 95% by weight of 22-carat or 24-carat gold.

Figure 2:
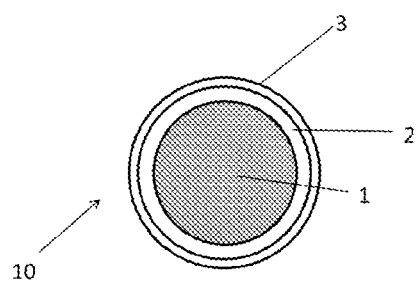
FIG. 2 shows a cross section side view of a piece of chocolate according to a second embodiment.
Figure 3:
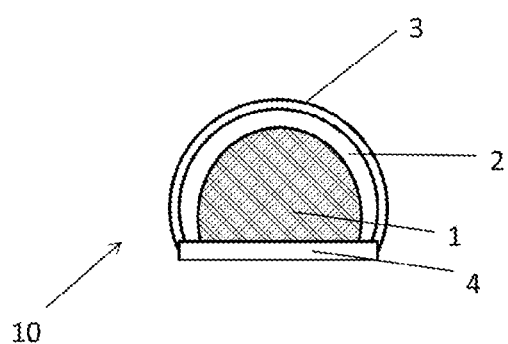
FIG. 3 shows a cross section side view of a piece of chocolate according to a third embodiment.

FIGS. 1, 2 and 3 depict different embodiments of the piece of chocolate according to a first embodiment.

FIG. 1 shows a cutaway side view of a piece of chocolate of the according to one embodiment. The piece of chocolate 10 comprises the edible metal foil 3 adhered on a part of the surface layer 2. The piece of chocolate comprises an inner part 1 which can comprise different fillings depending on the consumer's taste.

According to some embodiments the piece of chocolate of the invention is a molded chocolate, preferably with a half sphere or sphere shape.

According to some embodiments said chocolate has a diameter greater than or equal to 1.5 cm, preferably about 3.5 cm.

FIG. 2 shows a cross section side view of a second embodiment of the invention, corresponding to a sphere-shaped or round-shaped chocolate. The chocolate 10 comprises the foil 3 adhered on almost the entire surface of the surface layer 2. The piece of chocolate comprises an inner part 1 which can comprise different fillings depending on the consumer's taste.

Examples of filling for the different embodiments, and without limitation, are almond praline, hazelnut praline, liquor, the same composition as the surface layer 2 and/or fruit.

The illustrative non-limiting example below provides a method of adhering an edible metallic foil to an outside surface of a piece of chocolate.

Example: Preparation of a Piece of Chocolate According to One Method

A chocolate mold is first filled with chocolate, hitting the mold to remove bubbles that may be generated on the outer surface of the chocolate during the chocolate crystallization process. Once the chocolate thickens, it adheres to the walls of the mold, forming the outer body of the chocolate. The excess chocolate is emptied and subsequently filled with a desired filling. Once the chocolate's filling is adhered to the outer body of the chocolate, the last layer is poured in which will form the base 4 of the chocolate. In this last phase, the chocolate cannot be subjected to blows to prevent it from cracking since in that case, the foil would not be able to adhere suitably. Then, once the base 4 is dried, it is removed from the mold obtaining a chocolate with a half sphere shape the surface layer of which comprises 70% of cocoa paste and 30% of cocoa butter having a melting point greater than 26° C. and a thickness between 0.8 mm and 1.2 mm. In the embodiment shown, the chocolate has a diameter of about 3.5 cm. There is subsequently arranged a foil 3 comprising 97% gold of at least 22 carats having a thickness of 0.125 micrometers, a size of 8 cm by 8 cm and a weight of 0.0155 grams, with the help of a brush. The foil is arranged on the surface layer of the chocolate, therefore not on the base 4 given that the surface of the base 4 is not homogenous or level enough and the foil may break Once the foil has been placed on the surface layer of the chocolate, air at an approximate temperature of 50° C. and a flow of 250 l/min is delivered for 3 seconds by means of a heat gun, sufficient time for the cocoa butter to melt without the piece of chocolate losing its shape.

Once the foil has been attached to the surface layer, the chocolate is introduced in a chamber with controlled surrounding conditions of 20±2° C. and 55±5% relative humidity.

After the cocoa butter solidifies, the non-adhered part of the foil is removed with the help of a scissors and a brush.

FIG. 3 shows a cross section side view of an embodiment of the piece of chocolate performed according to the example method just described.

The chocolate 10 comprises a foil 3 adhered on a part of the surface layer 2. The piece of chocolate comprises an inner part 1 which can comprise different fillings depending on the consumer's taste. The chocolate comprises the base 4 which is incorporated before adhering the foil to the chocolate piece. This base can be a chocolate or cocoa butter base screen printed with colorant.

What is claimed is:

1. A method for coating a piece of chocolate comprising:
   a placement step, wherein an edible metal foil is arranged on at least one part of the outer surface of a surface layer of said piece of chocolate, said layer comprising cocoa butter;
   a heating step after the placement step, in which the piece of chocolate is exposed to a temperature equal to or greater than the melting temperature of the cocoa butter, such that the cocoa butter of said layer melts and attaches said foil to the layer, wherein during the heating step air having a temperature equal to or greater than the melting temperature of the cocoa butter is blown onto the foil that is arranged on the surface layer; and
   a solidification step after the heating step, wherein the piece of chocolate is exposed to a temperature less than the melting temperature of the cocoa butter and said cocoa butter solidifies, the foil being adhered to the surface layer of said piece of chocolate.

2. The method according to claim 1, wherein edible metal foil has a thickness less than 20 micrometers.

3. The method according to claim 1, wherein the edible metal foil has a thickness between 0.120 and 15 micrometers.

4. The method according to claim 1, wherein the edible foil is caused to cover between 20% and 100% of the total outer surface of the piece of chocolate.

5. The method according to claim 1, wherein the surface layer comprises between 0.1% and 99.9% of cocoa butter.

6. The method according to claim 1, wherein the surface layer comprises between 20% and 70% of cocoa butter.

7. The method according to claim 1, wherein the air of the heating step has a temperature between 25° C. and 200° C.

8. The method according to claim 7, wherein the air of the heating step has a flow rate of between 250 liters/min and 500 liters/min.

9. The method according to claim 1, wherein the air of the heating step has a flow rate of between 250 liters/min and 500 liters/min.

10. The method according to claim 1, wherein the solidification step is performed by subjecting the piece of chocolate to a temperature between 20° C. and 25° C. and to a relative humidity between 40% and 60%.

11. The method according claim 1, wherein the foil comprises gold.

12. The method according claim 1, wherein the foil comprises silver.

13. The method according claim 1, wherein the foil comprises gold and silver.

14. The method according to claim 1, wherein the piece of chocolate is a molded chocolate.

15. The method according to claim 14, wherein the chocolate comprises a half sphere shape.

16. The method according to claim 1, wherein the foil has a weight less than 0.100 grams.

17. The method according to claim 1, wherein the foil has a weight between 0.010 grams and 0.015 grams.

* * * * *